US005873611A

United States Patent [19]
Munley et al.

[11] Patent Number: 5,873,611
[45] Date of Patent: Feb. 23, 1999

[54] PIPE CLAMPING DEVICE

[75] Inventors: Daniel T. Munley, Laurel; Jeffrey E. Swensen, Eldersburg; H. Steve Graham, Silver Spring, all of Md.

[73] Assignee: EG&G Pressure Science, Inc., Beltsville, Md.

[21] Appl. No.: 814,038

[22] Filed: Mar. 10, 1997

[51] Int. Cl.⁶ .................................................. F16L 23/036
[52] U.S. Cl. ......................... 285/367; 24/20 W; 24/279; 285/410; 285/411; 285/420
[58] Field of Search ........................... 285/23, 367, 410, 285/411, 420; 24/279, 23 W, 20 W

[56] References Cited

U.S. PATENT DOCUMENTS

| | | |
|---|---|---|
| 627,987 | 7/1899 | Dick . |
| 2,677,866 | 5/1954 | Tetzlaff ..................................... 24/279 |
| 2,688,170 | 9/1954 | Balzer ......................................... 24/68 |
| 2,689,141 | 9/1954 | Kiekhaefer .............................. 285/129 |
| 2,706,648 | 4/1955 | Gosse ...................................... 285/129 |
| 2,806,276 | 9/1957 | Cooper .................................... 24/279 |
| 3,797,078 | 3/1974 | LaPointe ................................. 24/279 |
| 3,797,079 | 3/1974 | Nixon ....................................... 24/285 |
| 4,123,095 | 10/1978 | Stehlin .................................... 285/409 |
| 4,341,406 | 7/1982 | Abbes et al. ............................ 285/408 |
| 4,681,353 | 7/1987 | Halling .................................... 285/411 |
| 4,739,542 | 4/1988 | Krzesicki ................................. 24/285 |
| 4,919,453 | 4/1990 | Halling et al. .............................. 285/3 |
| 5,454,606 | 10/1995 | Voss et al. .............................. 285/367 |
| 5,509,702 | 4/1996 | Warehime et al. ..................... 285/409 |
| 5,513,228 | 4/1996 | Malmasson ............................. 376/203 |

FOREIGN PATENT DOCUMENTS

| | | |
|---|---|---|
| 509738 | 7/1930 | United Kingdom . |
| 339065 | 12/1930 | United Kingdom . |
| 1033659 | 5/1963 | United Kingdom . |
| 1126872 | 9/1965 | United Kingdom . |
| 1140636 | 1/1969 | United Kingdom . |

Primary Examiner—Anthony Knight
Assistant Examiner—Gary Grafel
Attorney, Agent, or Firm—Roylance, Abrams, Berdo & Goodman, L.L.P.

[57] ABSTRACT

A clamping device is disclosed for coupling peripheral flanges of a pair of tubular members together. The clamping device has a retaining member for coupling the peripheral flanges of the tubular member together, with first and second coupling ends being releasably coupled together by a latch assembly from an open position to a closed position. The latch assembly has a connecting member with a pivoting end and an anchoring end. The pivoting end of the connecting member is pivotally coupled to the first coupling end about a pivot axis between an unengaged position where the anchoring end is spaced from the second coupling end and an engaged position where the anchoring end is removably coupled to the second coupling end. The latch assembly further has a retention member coupled to the pivoting end of the connecting member for retaining the connecting member to the first coupling end. The retention member is deformable from an original shape to a final shape during installation of the connecting member being initially pivoted about the pivot axis from the unengaged position to the engaged position.

27 Claims, 7 Drawing Sheets

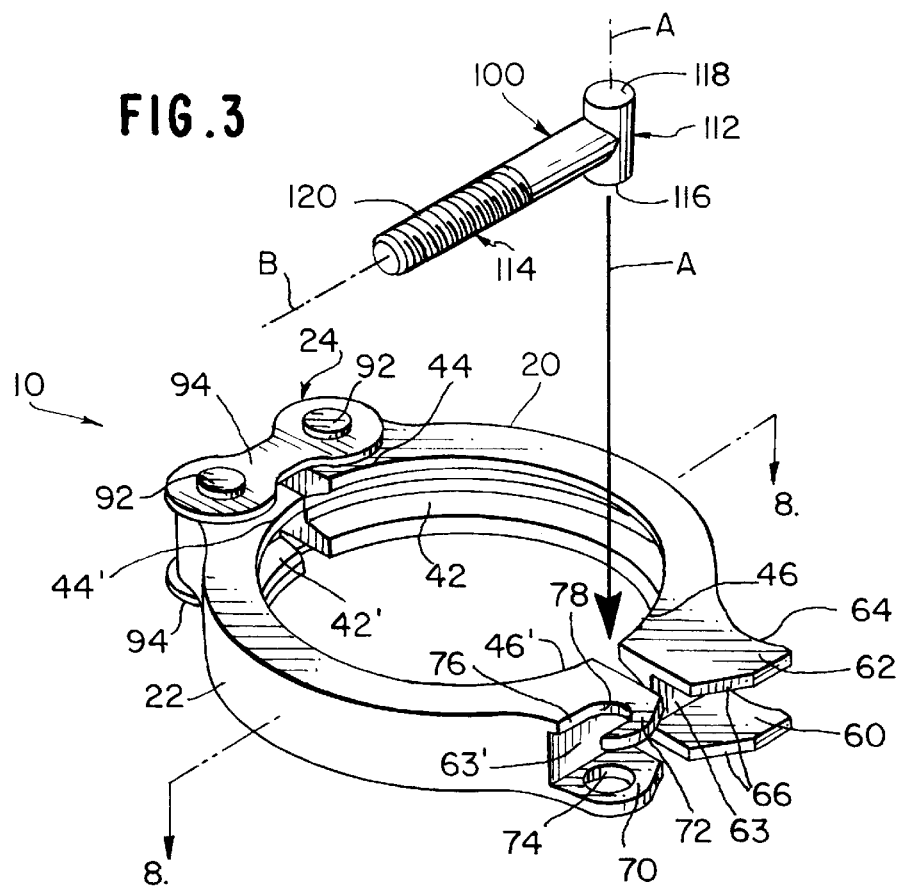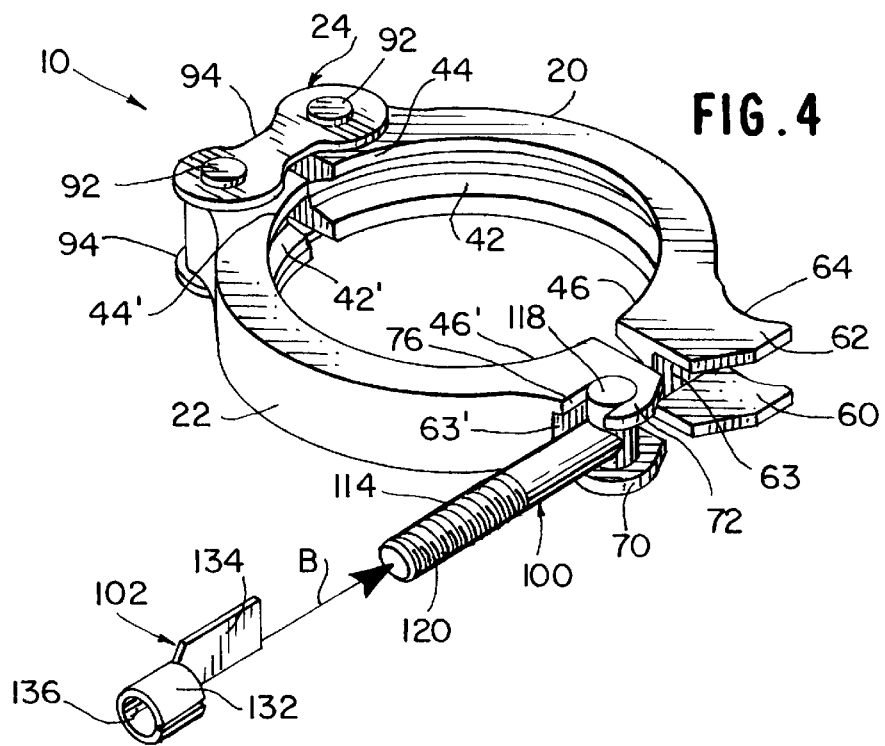

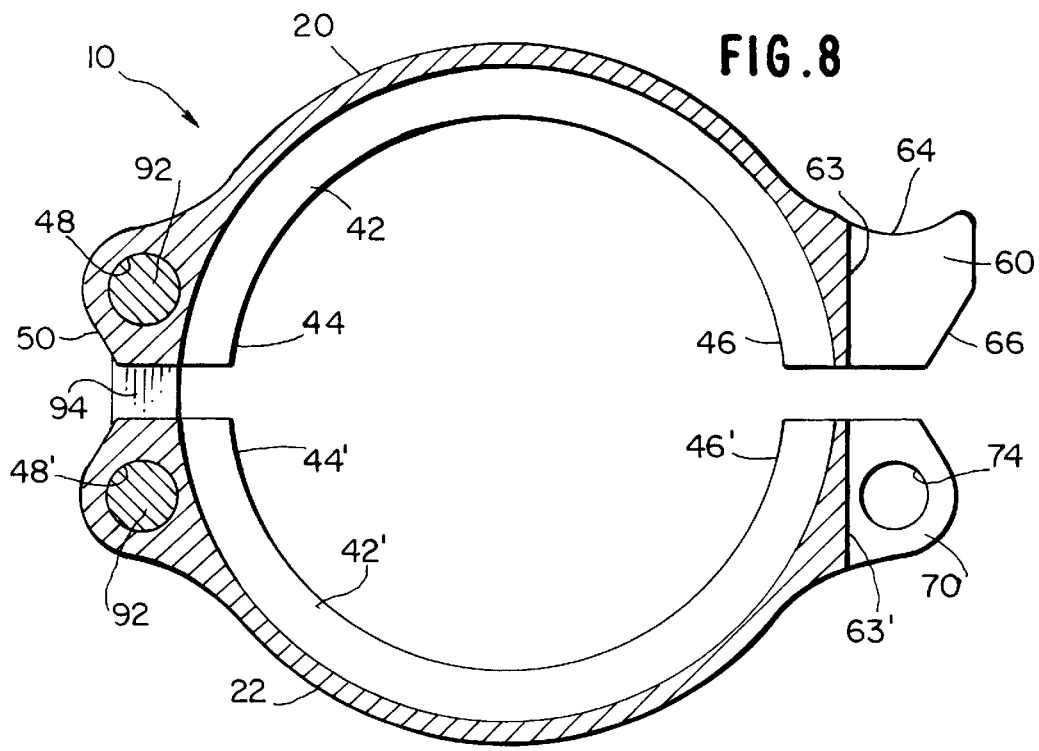
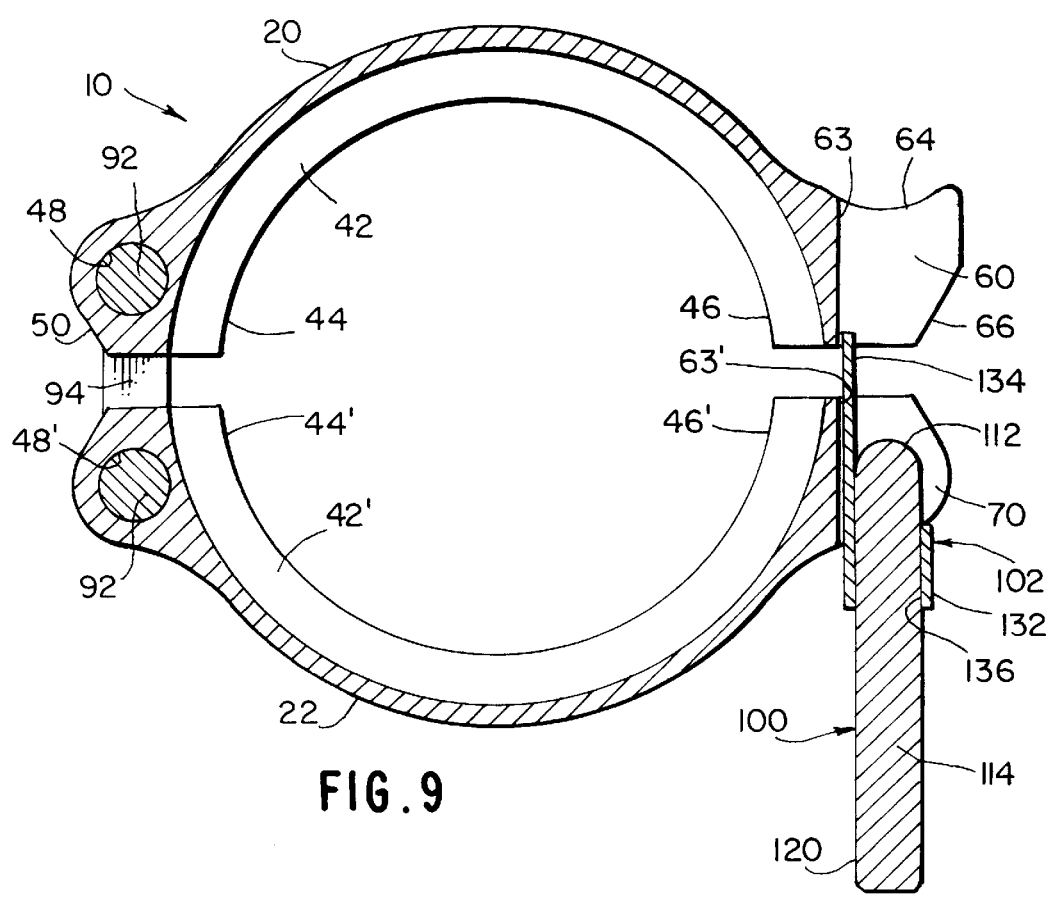

PIPE CLAMPING DEVICE

FIELD OF THE INVENTION

The present invention relates to a pipe clamping device for coupling a pair of pipes or tubular members together at their respective flanges. More specifically, the present invention relates to a pipe clamping device having two arcuate retaining members that are pivotally coupled together at one end by a hinge and releasably coupled together at the other end by a pivoting latch.

BACKGROUND OF THE INVENTION

Circular, V-couplings for clamping the peripheral end flanges of pipes together have been used for many years, especially in pipes conducting high temperature and pressure fluids. Currently, there are many types of V-couplings available for connecting the peripheral end flanges of pipes. One of the more common V-type couplings is fabricated from sheet metal retainers attached to tension bands. Although these types of pipe couplings were in widespread use in the aircraft and aerospace industries, their reliability was questionable owing to failures of their riveted or spot-welded joints and fatigue failures of their tension bands.

Another common type of V-coupling was later introduced using forged, cast, or machined retainers, with integrally hinged ends joined by eye bolt fasteners with retention pins and by connecting links. While some of these couplings have proven extremely reliable and efficient, they suffer from disadvantages which are addressed by the present invention.

Specifically, many of these prior couplings are relatively difficult to manufacture, often expensive, and relatively heavy. Additionally, these designs are relatively difficult to assemble and disassemble since the eye bolt must be manually held in the engaged position prior to tightening the bolt, and are difficult to repair without the use of factory equipment. Further, these later couplings use tension-type swing bolts and connecting links that are disposed at a considerable off-set distance from the neutral axis of the coupling retainer channel section. The resultant movement produced by the fastener tightening torque causes inward rotation of the retainer ends which, in turn, locally deflects the flanges of the pipes inwardly. Opposite the fastener, the two retainers are joined by one or more non-adjustable links, that are offset from the circumferential loading line between the two retainers. This offset arrangement in this type of coupling is essential to the proper functioning of the coupling so that tension is transmitted through the linked retainer ends entirely symmetrically. Accordingly, the same amount of undesirable inward deflection occurring at the fastener ends of the retaining member is also produced at the hinged ends of the retaining member.

Examples of some prior couplings are disclosed in U.S. Pat. No. 5,513,228 to Malmasson; U.S. Pat. No. 5,509,702 to Warehime et al.; U.S. Pat. No. 5,454,606 to Voss et al.; U.S. Pat. No. 4,919,453 to Halling et al.; U.S. Pat. No. 4,739,542 to Krzesicki; U.S. Pat. No. 4,681,353 to Halling; U.S. Pat. No. 4,341,406 to Abbes et al.; U.S. Pat. No. 4,123,095 to Stehlin; U.S. Pat. No. 3,797,079 to Nixon; U.S. Pat. No. 3,797,078 to LaPointe; U.S. Pat. No. 2,706,648 to Gosse; U.S. Pat. No. 2,689,141 to Kiekhaefer; U.S. Pat. No. 2,688,170 to Balzer; and U.S. Pat. No. 627,987 to Dick. Examples of other prior couplings are disclosed in Great Britain Patent Nos. 509,738 to Thompson; 1,126,872 to Avica Equipment Limited; 339,065 to Malleville; and 1,140,636 to Rolls Royce Limited.

Thus, there is a continuing need to provide improved pipe coupling devices that are inexpensive, light-weight, easy to assemble and disassemble, and that provide symmetrical loading. This invention addresses this need in the art as well as other needs which will become apparent to those skilled in the art once given this disclosure.

SUMMARY OF THE INVENTION

One object of the present invention is to provide a pipe clamping device that is relatively compact, inexpensive, and light-weight.

Still another object of the invention is to provide a pipe clamping device having a latch assembly that is relatively easy to assemble and disassemble for enabling field replacement of all latch assembly components.

A further object of the invention is to provide a retention member that has a positioning feature to maintain the latch assembly in the engaged position prior to tightening of the latch assembly.

The foregoing objects are basically attained by providing a clamping device for coupling peripheral flanges of a pair of tubular members together, comprising a retainer means for coupling the peripheral flanges of the tubular member together, and having first and second coupling ends movably coupled together from an open position to a closed position; a connecting member having a pivoting end and an anchoring end with the pivoting end being pivotally coupled to the first coupling end about a pivot axis between an unengaged position where said anchoring end is spaced from the second coupling end and an engaged position where the anchoring end is removably coupled to the second coupling end; and retention means, coupled to the pivoting end of the connecting member, for maintaining the connecting member coupled to the first coupling end, the retention means being deformable from an original shape to a final shape in response to the connecting member being initially pivoted about the pivot axis from the unengaged position to the engaged position.

The foregoing objects are also attained by a clamping device comprising a retainer having first and second coupling ends movably coupled together from an open position to a closed position, respectively, the first coupling end having a first opening and a second opening; a connecting member positioned between the first and second openings, the connecting member having a pivoting end and an anchoring end with a longitudinal axis extending therebetween, the pivoting end having a first pivoting element pivotally coupled to the first opening and a second pivoting element pivotally coupled to the second opening to pivot the connecting member about a pivot axis between an unengaged position with the anchoring end being spaced from the second coupling end in engaged position with the anchoring end being removably coupled to the second coupling end, the second opening of the first coupling end being sized to receive the connecting member between the first and second openings by allowing movement of the connecting member in a direction substantially parallel to the pivot axis to engage and disengage the second pivot element from the first opening; and a retention member coupled to the pivoting end of the connecting member for prohibiting movement of the fastener in a direction parallel to the pivot axis.

The foregoing objects are further attained by a method of forming a clamping device comprising the steps of providing a retainer having first and second coupling ends pivotally coupled together from an open position to a closed position, the first coupling end having first and second mounting members with first and second openings, respectively, the first coupling end further having a pivoting axis extending through the mounting members, inserting a fastener between the mounting members of the retainer, the fastener having a pivoting end and an anchoring end with a longitudinal axis extending therebetween, the pivoting end having first and second pivoting elements, the fastener being inserted into the retainer by moving the first pivoting element substantially along the pivot axis to engage the securing portion, and to pivotally couple the fastener to the first retainer and such that the fastener can pivot about the pivot axis between an unengaged position where the anchoring end is spaced from the second retainer end to an engaged position where the anchoring end is removably coupled to the second retainer end; and coupling a retention member to the pivoting end of the fastening member to prohibit the pivoting end from being accidentally removed from the first retainer end, the retention member coupled to the pivoting end between the first and second mounting members to prohibit movement of the fastener in a direction along the pivot axis.

The foregoing objects are still further attained by a clamping device for coupling a pair of tubular members together, comprising a retainer having first and second coupling ends movably coupled together between an open position and a closed position, the first coupling end having a first and second mounting member with first and second openings, respectively; and a latch assembly releasably coupling the first and second ends together between a latched position and an unlatched position, the latch assembly including a connecting member having a pivoting end with first and second pivot elements pivotally coupled to the first coupling end of the retainer and a second anchoring end operatively engageable with the second coupling end of the retainer, a retention member coupled to the pivoting end of the fastener and located between the first and second mounting members, and a tightening member movably coupled to the anchoring end of the connecting member.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the attached drawings which form a part of this original disclosure:

FIG. 3 is a partial, exploded perspective view of the pipe clamping device of FIGS. 1 and 2 in accordance with the present invention, illustrating the manner of inserting the bolt of the latching assembly into the openings of one of the retainers;

FIG. 4 is a partial, exploded perspective view similar to FIG. 3, illustrating the pipe clamping device of FIGS. 1–3 with the bolt engaged within the clamping device and also illustrating the manner of attaching the retaining member to the bolt;

FIG. 8 is a transverse cross-sectional view of the pipe clamping device illustrated in FIGS. 1–7 and taken along line 8—8 of FIG. 3;

FIG. 9 is a transverse, cross-sectional view of the pipe clamping device illustrated in FIGS. 1–8 and taken along line 9—9 of FIG. 5;

DETAILED DESCRIPTION OF PREFERRED EMBODIMENTS

Figure 1:
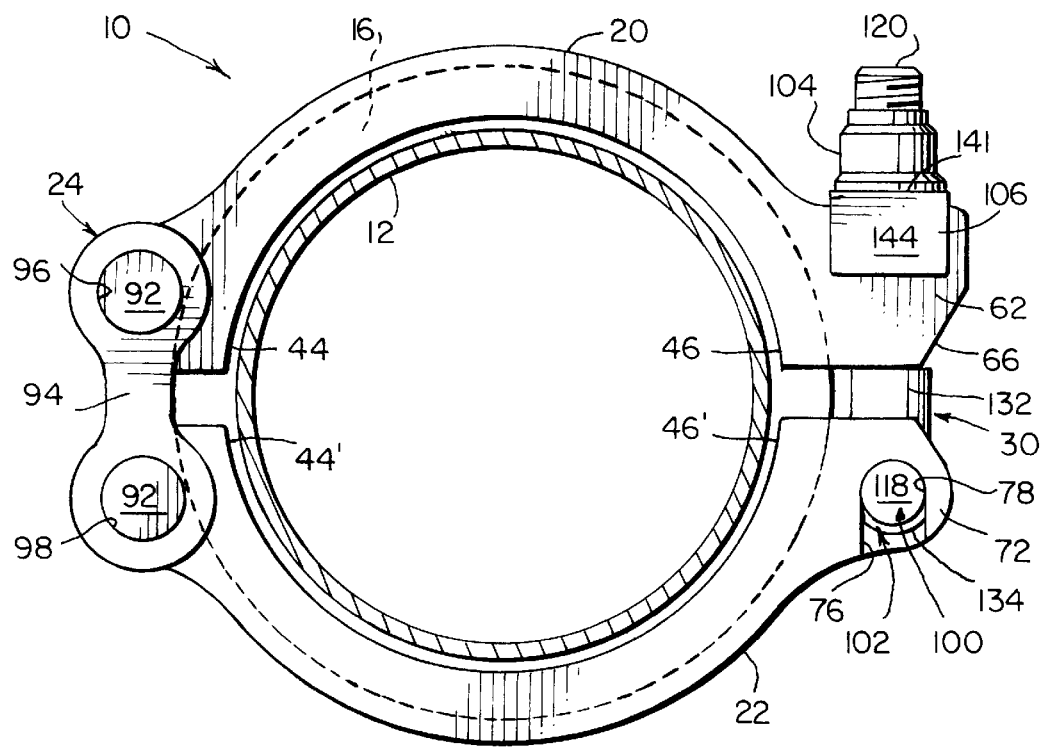
FIG. 1 is a side elevational view of a pipe clamping device in accordance with the present invention coupled about the peripheral flanges of a pair of coaxial pipes with one of the pipes shown in cross-section.
Figure 2:
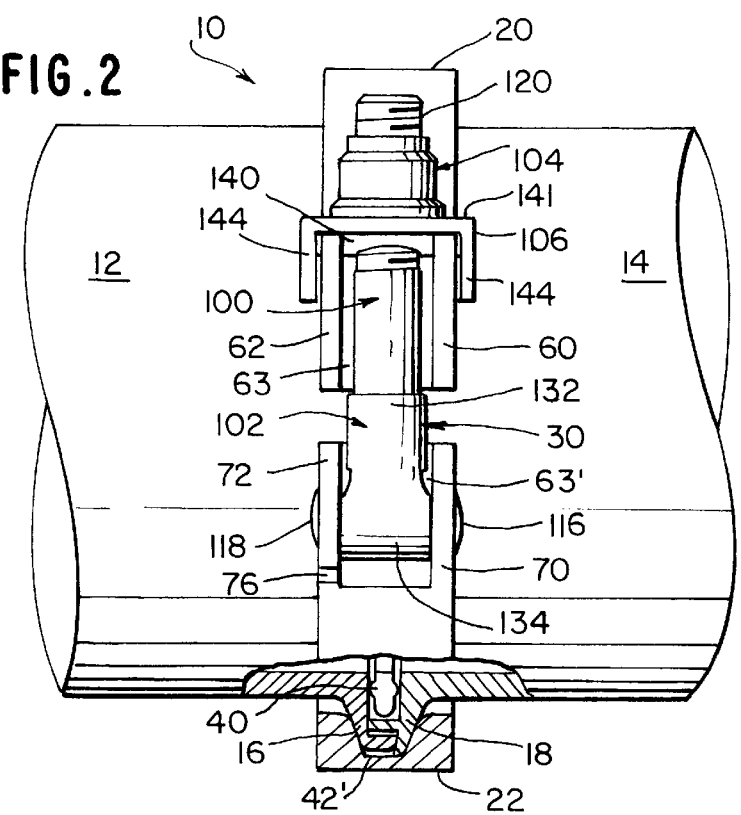
FIG. 2 is a front end elevational view of the pipe clamping device of FIG. 1, illustrating the latch assembly coupled about the peripheral flanges of the pipes with portions of the pipes and the clamping device broken away to illustrate the junction between the flanges of the pipes.

As seen in FIGS. 1 and 2, a V-coupling or pipe clamping device 10 in accordance with the present invention is illustrated for fixedly coupling first and second coaxial pipes 12 and 14 together by their peripheral flanges 16 and 18, respectively. Pipe clamping device 10 includes a first or upper retainer 20 for engaging first contact surfaces of peripheral flanges 16 and 18 of pipes 12 and 14, a second or lower retainer 22 for engaging second contact surfaces of peripheral flanges 16 and 18 of pipes 12 and 14, a hinge assembly 24 for coupling one of the ends of retainers 20 and 22 together, and a latch assembly 30 for releasably coupling the other ends of retainers 20 and 22 together.

It will be apparent to those skilled in the art from this disclosure that hinge assembly 24 and latch assembly 30 can be modified to incorporate the benefits of the low distortion coupling described in commonly assigned U.S. Pat. No. 5,509,702 to Warehime et al., filed Aug. 23, 1994. The portions of U.S. Pat. No. 5,509,702 pertaining to the retainers and hinge assembly are hereby incorporated herein by reference.

Pipes 12 and 14 are conventional pipes, tubes or conduits with peripheral end flanges 16 and 18, respectively, that are engaged by retainers 20 and 22 for coupling pipes 12 and 14 together. In particular, flanges 16 and 18 have tapered contact surfaces so that upon tightening retainers 20 and 22 thereabouts, flanges 16 and 18 are forced together. Since pipe clamping device 10 can be designed for most flanged pipes, the details of pipes 12 and 14 will not be discussed or illustrated in detail herein. A seal 40 is positioned between peripheral flanges 16 and 18 of pipes 12 and 14 for sealing the connection therebetween as seen in FIG. 2. Moreover, since seals, such as pressure energized seal 40, are well-known in the art, seal 40 will not be discussed or illustrated in detail herein.

Referring now to FIGS. 1–3 and 8, first retainer 20 is an arcuate retaining member having a substantially V-shaped gripping groove 42 extending from a first hinge end 44 of first retainer 20 to a second coupling end 46 of retainer 20. Preferably, the arc extending between first hinge end 44 and coupling end 46 of retainer 20 is approximately 180° or slightly less than 180°. Retainer 20 is preferably integrally formed as a one-piece, unitary member constructed out of a suitable metallic material typically used in the pipe coupling art, such as INCONEL 718, other stainless steels, a high strength, corrosion resistant and high temperature tolerant metal alloy such as A-286, or any other suitable material.

A pivot hole 48 is formed in first retainer 20 adjacent its first hinge end 44 for pivotally attaching one end of hinge assembly 24 thereto, as discussed below. Pivot hole 48 is a closed pivot hole having an inner surface or coupling surface that extends through an arc of 360°. However, pivot hole 48 can be an open pivot hole or pivot slot that has a curved coupling surface extending through an arc of greater than 180° but less than 360°. Since a pivot slot minimizes the size of the bar stock needed to manufacture retainer 20, it would further reduce the weight of clamping device 10. The use of closed pivot holes and open pivot slots is discussed in greater detail in commonly assigned U.S. patent application Ser. No. 08/329,985 to Warehime et al., filed Oct. 27, 1994. The sections of U.S. patent application Ser. No. 08/329,985 pertaining to the retainers and to the hinge assembly are hereby incorporated herein by reference.

A pair of gusset plates 60 and 62 are formed on first retainer 20 adjacent its coupling end 46. Gusset plates 60 and 62 are substantially parallel to each other and extend substantially perpendicularly from a front surface 63 of coupling end 46. In the preferred embodiment, gusset plates 60 and 62 are spaced sufficiently to receive latch assembly 30 therebetween as described below. Each gusset plate 60 and 62 has a curved rear saddle surface or retaining surface 64. Curved retaining surfaces 64 matingly engage part of latch assembly 30 to releasably retain latch assembly 30 on gusset plates 60 and 62 as discussed below.

The gripping groove 42 of retainer 20 has a V-shaped cross-sectional profile. Various types of V-shaped cross-sectional profiles may be used within retainer 20 as further described in detail in U.S. patent application Ser. No. 08/329,285 to Warehime et al., filed Aug. 23, 1994. The portions of U.S. patent application Ser. No. 08/329,285 pertaining to the gripping grooves have already been incorporated herein by reference.

Second or lower retainer 22 is substantially identical to first or upper retainer 20, except that its connection to latch assembly 30 has been slightly modified such that latch assembly 30 is pivotally coupled to second retainer 22. Accordingly, like reference numerals with primes will be used to indicate portions of second retainer 22 that are similar to first retainer 20. In view of the similarities between retainers 20 and 22, only the portion of second retainer 22 modified for pivotally coupling latch assembly 30 thereto will be discussed in detail herein. Basically, second retainer 22 has a gripping groove 42' extending from a first hinge end 44' to a second coupling end 46'. First hinge end 44' has a pivot hole 48', while second end 46' has a pair of gusset plates or mounting members 70 and 72 extending from a front surface 63'.

Referring again to FIGS. 1–3 and 8, hinge assembly 24 includes a pair of pivot pins 92 and a pair of links 94 for pivotally coupling first ends 44 and 44' of retainers 20 and 22 together. Pivot pins 92 are in the form of rivets which are deformed at one end for securing links 94 to retainers 20 and 22. Specifically, links 94 each have a first pivot hole 96 at one end for receiving one of the pivot pins 92 therein, and a second pivot hole 98 at its other end for receiving the other pivot pin 92 therein. A pivot pin 92 is received in each of pivot holes 48 and 48' in retainers 20 and 22, respectively.

Links 94 are dog-bone shaped links constructed of any suitable material used in the pipe coupling field in which the pipe coupling device will be used. For example, links 92 can be made of INCONEL 718 or any suitable stainless steel. It will be apparent to those skilled in the art from this disclosure that a plurality of links can be used, depending on the size of the links needed and/or desired.

Gusset plates 70 and 72 of second retainer 22 are substantially parallel to each other and extend substantially perpendicularly from front surface 63' of second retainer 22 in substantially the same way in which gusset plates 60 and 62 extend from front surface 63 of first retainer 20. However, gusset plates 70 and 72 are adapted for pivotally coupling latch assembly 30 thereto. More specifically, gusset plate 70 has a closed circular aperture or opening 74 that extends completely therethrough. Opening 74 is sized to pivotally receive part of latch assembly 30 as discussed below. Gusset plate 72 has an opening or slot 76 that opens away from gusset plates 60 and 62. Slot 76 has a curved base portion 78 that is curved to form a half circle with the same radius as opening 74. Also, the center of the arc which forms base portion 78 is located on the axis extending through the center of opening 74.

As best seen in FIG. 1, latch assembly 30 includes a connecting member or fastener 100, a retention member 102, a tightening member or nut 104, and a bearing member 106. Latch assembly 30 is pivotally coupled to second end 46' of second retainer 22, and releasably coupled to second end 46 of first retainer 20.

As best seen in FIG. 3, fastener 100 is preferably a bolt in the form of a T-bolt with a pivoting end or head 112 and an anchoring end or rod 114 extending from head 112. Bolt 100 is preferably constructed out of a conventional metallic material such as A 286 stainless steel, or any other suitable high strength material. Head 112 of bolt 100 is a substantially cylindrical member having a first trunion or pivoting element 116 and a second trunion or pivoting element 118 that are positioned about a common axis A. First and second pivoting elements 116 and 118 are substantially identical, except that they extend outwardly in opposite directions from rod 114. Also, first and second pivoting elements 116 and 118 are pivotally received in openings 74 and 76 so that bolt 100 pivots about axis A. Bolt 100 is coupled to gussets 70 and 72 by retention member 102 such that pivoting elements 116 and 118 are maintained with openings 74 and 76 as discussed below.

Rod 114 of bolt 100 is cylindrical and has a longitudinal axis B that extends substantially perpendicularly to axis A. Rod 114 extends perpendicularly from head 112 to a threaded free end 120 for threadedly receiving nut 104. The end of rod 114 adjacent head 112 is preferably unthreaded.

As best seen in FIG. 4, retention member 102 has a collar portion 132 and an elongated retaining portion 134 in its undeformed state, i.e., prior to bending of elongated retaining portion 134. Retention member 102 is a one-piece unitary member which is preferably made from sheet metal. One suitable material for retention member 102 is a corrosion resistant metal alloy such as CRES-321.

Collar portion 132 is a hollow cylinder with an inner cylindrical surface 136 slightly larger than the outer surface of rod 114 for slidably receiving rod 114 therein. Preferably, collar portion 132 has a longitudinal split as seen in FIG. 4 such that it can be easily fabricated from a single, flat piece of sheet metal. Of course, collar portion 132 can be made as a continuous hollow cylinder, if needed and/or desired. Collar portion 132 extends a sufficient length to adequately support itself on rod 114 as discussed below.

As best seen in FIG. 4, elongated retaining portion 134 is integrally attached to collar 132 and extends outwardly therefrom, in its original, undeformed configuration, as a flat, planar member with a generally rectangular shape. The transverse width of elongated retaining portion 134 is sized to be greater than the outside diameter of collar 132, but slightly less than the distance between both gusset plates 60 and 62 of first retainer 20 and gusset plates 70 and 72 of second retainer 22. This enables elongated retaining portion 134 to extend between both gusset plates 60 and 62 of first retainer 20 and gusset plates 70 and 72 of second retainer 22. Elongated retaining portion 134 is formed and sized such that it is permanently deformable to a curved configuration corresponding to and partially surrounding head 112 of bolt 100 as discussed below.

Figure 6:
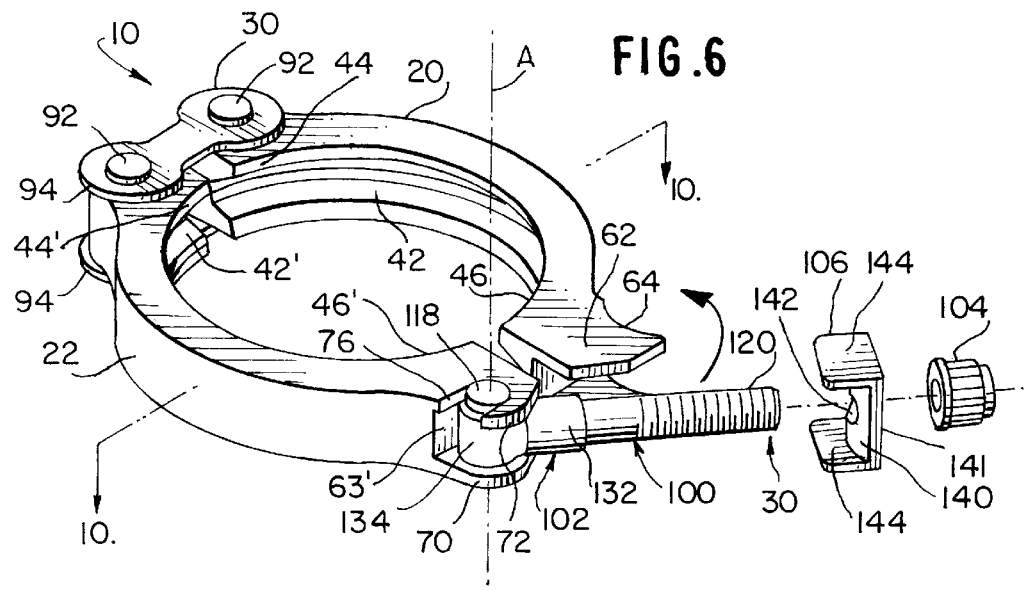
FIG. 6 is a perspective view similar to FIGS. 3–5, illustrating the pipe clamping device of FIGS. 1–5 with the latch assembly being pivoted towards the engaged position.
Figure 7:
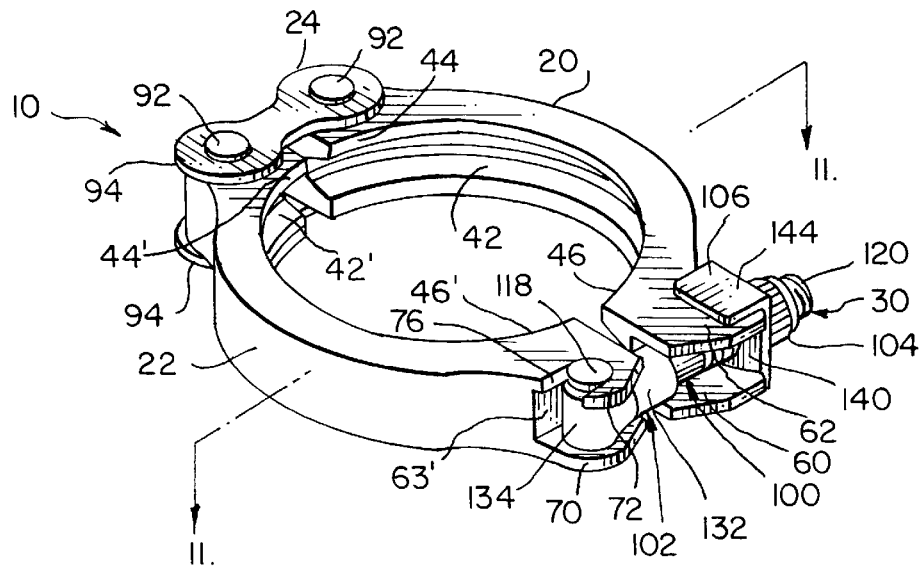
FIG. 7 is a perspective view similar to FIGS. 3–6, illustrating the pipe clamping device of FIGS. 1–6 with the latching assembly in the engaged position.
Figure 11:
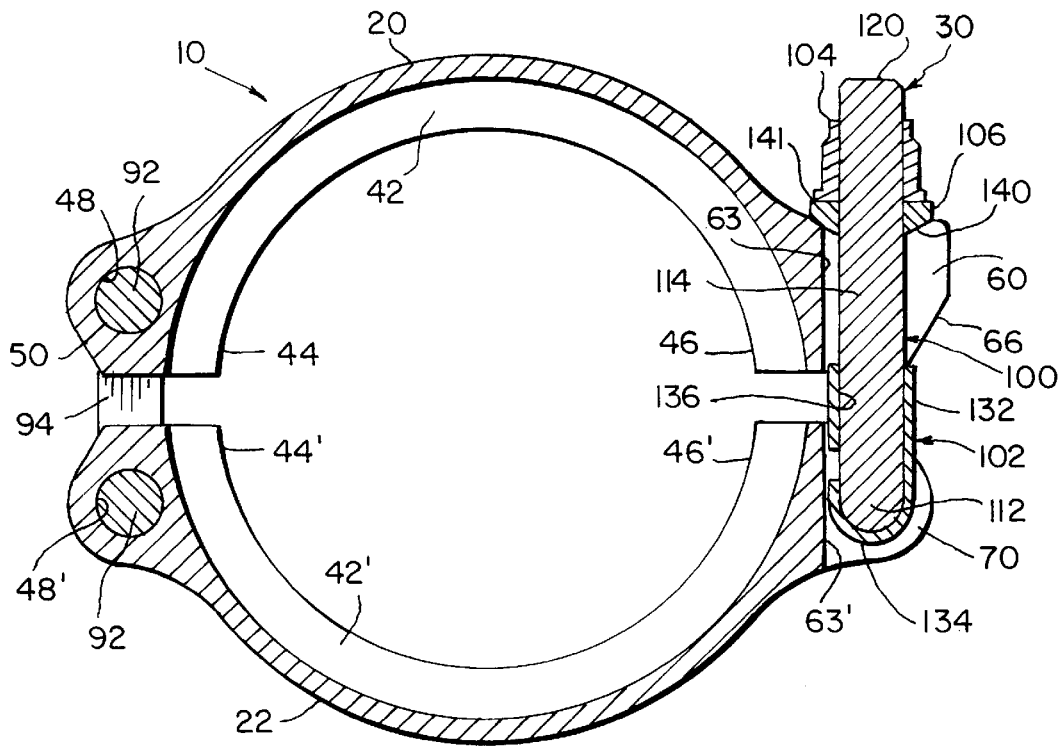
FIG. 11 is a transverse, cross-sectional view of the pipe clamping device illustrated in FIGS. 1–10 and taken along line 11—11 of FIG. 7.
Figure 10:
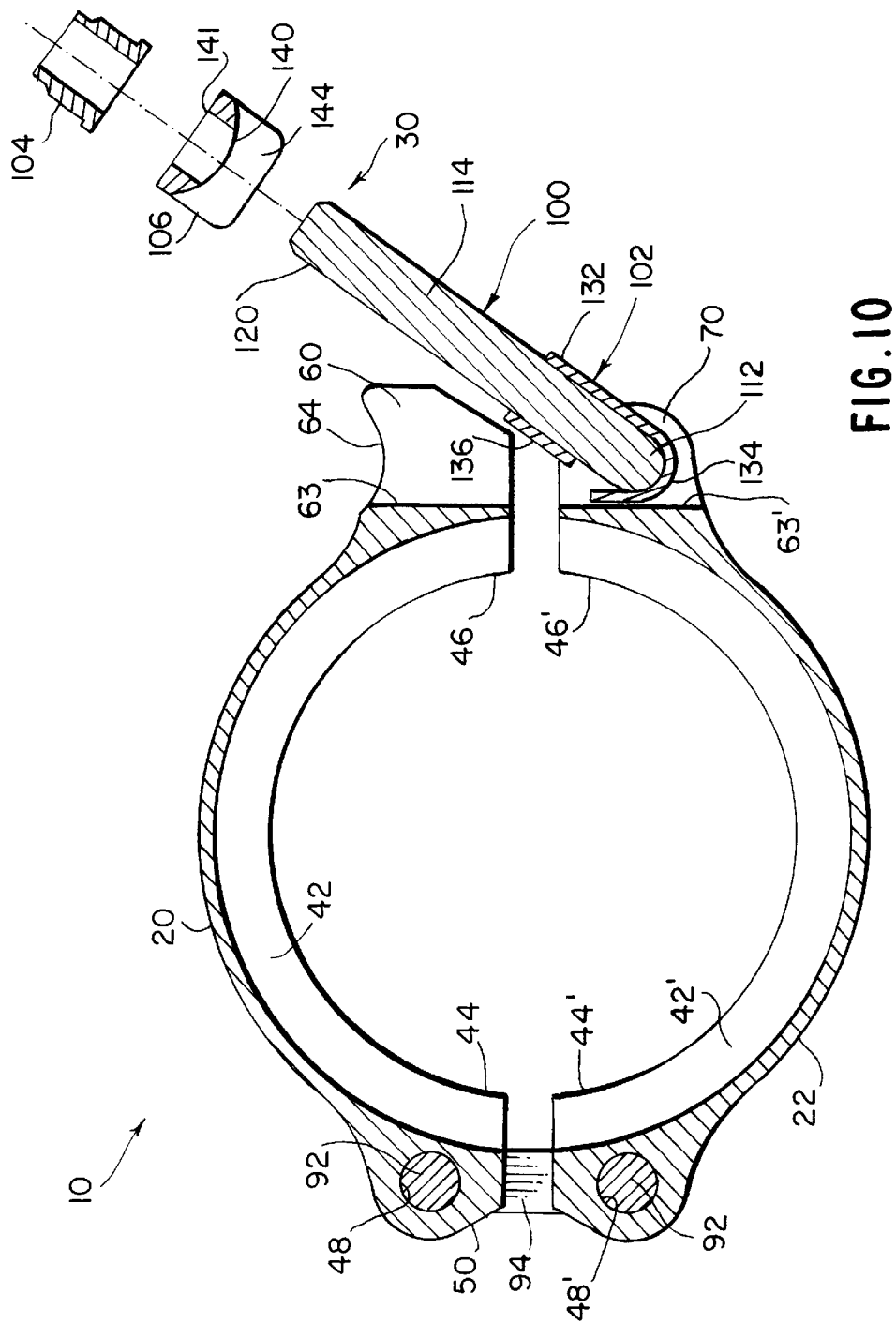
FIG. 10 is a transverse, cross-sectional view of the pipe clamping device illustrated in FIGS. 1–9 and taken along FIG. 10—10 of FIG. 6.

As seen in FIGS. 6, 10 and 11, tightening member or nut 104 is preferably a common self-locking nut which is sized to be threadedly received onto threaded end 120 of rod 114. Bearing member 106, is a generally U-shaped saddle washer. Saddle washer 106 has a curved bearing surface 140 on one side for engaging and mating with curved surfaces 64 of gusset plates 60 and 62, and a flat surface 141 on its other side for engaging locking nut 104. Saddle washer 106 also has a center bore 142 for slidably receiving rod 114 of bolt 100 therein and parallel sidewalls 144 that are perpendicular to flat surface 141. Sidewalls 144 are spaced apart such that when saddle washer 106 is in the engaged position, gusset plates 60 and 62 of first retainer 20 are received within saddle washer 106 and positioned between sidewalls 144. Locking nuts 104 and saddle washer 106 are each preferably one-piece, unitary members which can be cast or machined from any suitable material such as INCONEL 713 or 718.

Assembly and Disassembly

Generally, clamping device 10 is installed onto peripheral flanges 16 and 18 after pipes 12 and 14 have been axially aligned with seal 40 positioned therebetween. More specifically, as seen in FIGS. 1 and 2, retainers 20 and 22 of clamping device 10 are positioned around flanges 16 and 18 such that flanges 16 and 18 are received within V-shaped grooves 42 and 42'.

Referring now to FIGS. 3–11, latch assembly 30 of clamping device 10 is assembled in the following manner. First, referring to FIGS. 3 and 4, bolt 100 is first inserted into opening 74 and 76 of gusset plates 70 and 72 of second retainer 22. Head 112 is now moved along axis A until head 112 and a portion of rod 114 pass through slot 76 of gusset plate 72 and first pivoting element 116 is completely inserted into opening 74 of gusset plate 70. More specifically, head 112 of bolt 100 is positioned such that axis A of head 112 aligns with the center axis of openings 74 and 76, and thus, axis A becomes the pivoting axis of bolt 100. Opening 74 of gusset plate 70 and first pivot element 116 are sized so that first pivoting element 116 can rotate within opening 74. Since opening 74 of gusset plate 70 is a closed opening, first pivoting element 116 is prohibited from any substantially lateral movement in a direction transverse to axis A.

Once first pivoting element 116 is fully inserted into opening 74, second pivoting element 118 will be positioned within slot 76 of gusset plate 72. The radius of base portion 78 is slightly larger than the radius of second pivoting element 118 such that second pivoting element 118 can pivot freely against base portion 78 about axis A.

Figure 5:
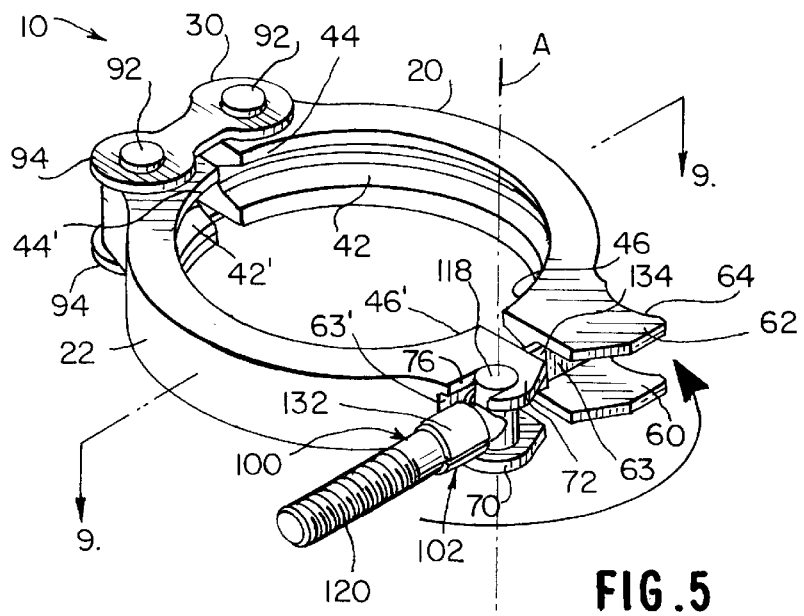
FIG. 5 is a perspective view similar to FIGS. 3 and 4, illustrating the pipe clamping device of FIGS. 1–4 with the retention member engaged with the bolt but prior to the retention member being deformed.

As seen in FIGS. 4, 5 and 9, once pivoting elements 116 and 118 are engaged within opening 74 and slot 76, respectively, and rod 114 of bolt 100 is positioned between gusset plates 70 and 72, retention member 102 is coupled to bolt 100. In particular, retention member 102 is then placed on rod 114 by sliding collar portion 132 around rod 114 along axis B until collar portion 132 abuts head 112. As best seen in FIG. 9, when collar portion 132 is placed on bolt 100 with collar portion 132 abutting head 112 of rod 114, elongated retaining portion 134 of retention member 102 extends between gusset plates 70 and 72 adjacent front surface 63' second retainer 22 as well as extends partially between gusset plates 60 and 62 adjacent front surface 63 of first retainer 20.

Next, as seen in FIGS. 5–7 and 9–11, bolt 100 is then pivoted about axis A, which is now also the pivot axis for bolt 100, to deform elongated retaining portion 134 about head 112 of rod 114. While bolt 100 is pivoted about axis A from the unengaged position towards engagement with gusset plates 60 and 61, elongated retaining portion 134 of retention member 102 abuts against front surfaces 63 and 63' which are formed between gusset plates 60 and 62 and 70 and 72 of retainers 20 and 22, respectively. The section of elongated retaining portion 134 adjacent collar portion 132 then begins deforming to the shape of head 112 of bolt 100 as best seen in FIG. 10.

The deformation of elongated retaining portion 134 continues along the length of elongated retaining portion 134 until elongated retaining portion 134 has been completely deformed about head 112 of bolt 100. That is, until elongated retaining portion 134 has been deformed to sufficiently surround head 112 to retain bolt 100 between gusset plates 70 and 72. Complete deformation of elongated retaining portion 134 occurs when bolt 100 is completely pivoted about axis A to the engaged position between gusset plates 60 and 62. As best seen in FIGS. 6 and 11, after being fully deformed, elongated retaining portion 134 takes the shape of a hollow partial cylinder surrounding head 112.

Prior to the placement of retention member 102 around bolt 100, head 112 of bolt 100 can be moved along axis A and withdrawn from gusset plates 70 and 72. However, once retention member 102 is deformed to surround head 112, bolt 100 can no longer be moved accidentally out from between gusset plates 70 and 72. When elongated portion 134 is deformed around head 112, elongated portion 134 abuts the inner surfaces of gusset plates 72 and 74 to prevent any substantial movement of head 112 of bolt 100 along axis A as well as to prevent pivoting element 118 of bolt 100 from twisting out of the open end of slot 76 of gusset plate 72. Therefore, bolt 100 can now be freely pivoted between the engaged and disengaged positions without becoming separated from opening 74 and slot 76 of gusset plates 70 and 72.

When it is desired to tighten retainers 20 and 22 around the peripheral flanges 16 and 18 of pipes 12 and 14, bolt 100, with retention member 102 thereon, is pivoted about axis A to the engaged position for engaging coupling end 46 of first retainer 20. In the engaged position, the threaded end 120 of bolt 100 is positioned between gusset plates 60 and 62. Saddle washer 106 is then placed on bolt 100 by inserting rod 114 of bolt 100 through center bore 142 of saddle washer 106. Curved surfaces 140 of saddle washer 106 now engage and mate with saddle surfaces 64 of gusset plates 60 and 62 and sidewalls 144 of saddle washer 106 engage gusset plates 60 and 62 to align bolt 100 between gusset plates 60 and 62 and to ensure a tensile loading. Nut 104 is then threaded onto threaded end 120 of rod 114 to apply a tensile load to bolt 100 and force ends 46 and 46' of retainers 20 and 22 towards each other for securing pipes 12 and 14 together.

When it is desired to remove clamping device 10 from pipes 12 and 14, nut 104 is rotated sufficiently to provide clearance for nut 104 and washer 106 to disengage from gusset plates 60 and 62. Of course, nut 104 can simply be removed from bolt 100, along with saddle washer 106 to remove clamping device 10 from pipes 12 and 14. Bolt 100 is then able to once again pivot freely about axis A between the engaged position and the disengaged position. As stated above, retention member 102 ensures that bolt 100 will remain fully secured within gusset plates 70 and 72 of second retainer 22.

In the event that bolt 100 should become damaged or break, bolt 100 can be easily replaced at the field location where clamping device 10 is being used or any other convenient location. Bolt 100 is replaced simply by reversing the steps necessary for attaching retention member 102 to bolt 100. In other words, an individual can manually bend elongated retaining portion 134 away from head 112 of bolt 100 until elongated retaining portion 134 becomes sufficiently straight as to resemble its original form shown in FIG. 4. Retention member 102 can then be slid off bolt 100 in a direction away from head 112 which is opposite to the direction shown in FIG. 4. Alternatively, retention member 102 can simply be cut away from bolt 100 using a tool.

Once retention member 102 is removed from bolt 100, bolt 100 is easily removed from gusset plates 70 and 72 by moving bolt 100 to the fully disengaged position as shown in FIG. 4 and then moving bolt 100 along axis A away from gusset plate 70, i.e., in the opposite direction shown in FIG. 3. A new bolt 100 and new retention member 102 can then be inserted into engagement with gusset plates 70 and 72 using the same steps discussed above, thus, enabling the clamping device 10 to function once again as discussed above. Depending on the condition of the retention member 102, the original retention member 102 may be capable of being reused and deformed again as it was originally deformed as described above instead of using a new retention member 102. Also, it should be understood that the basic replacement method described above can be used if parts other than bolt 100 have failed or for any other reason.

Second Embodiment

Figure 12:
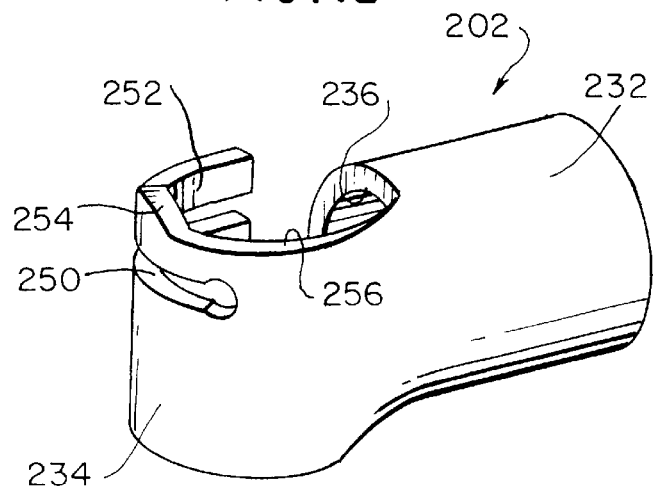
FIG. 12 is an enlarged perspective view of a retention member in its deformed configuration in accordance with a second embodiment of the present invention.
Figure 13:
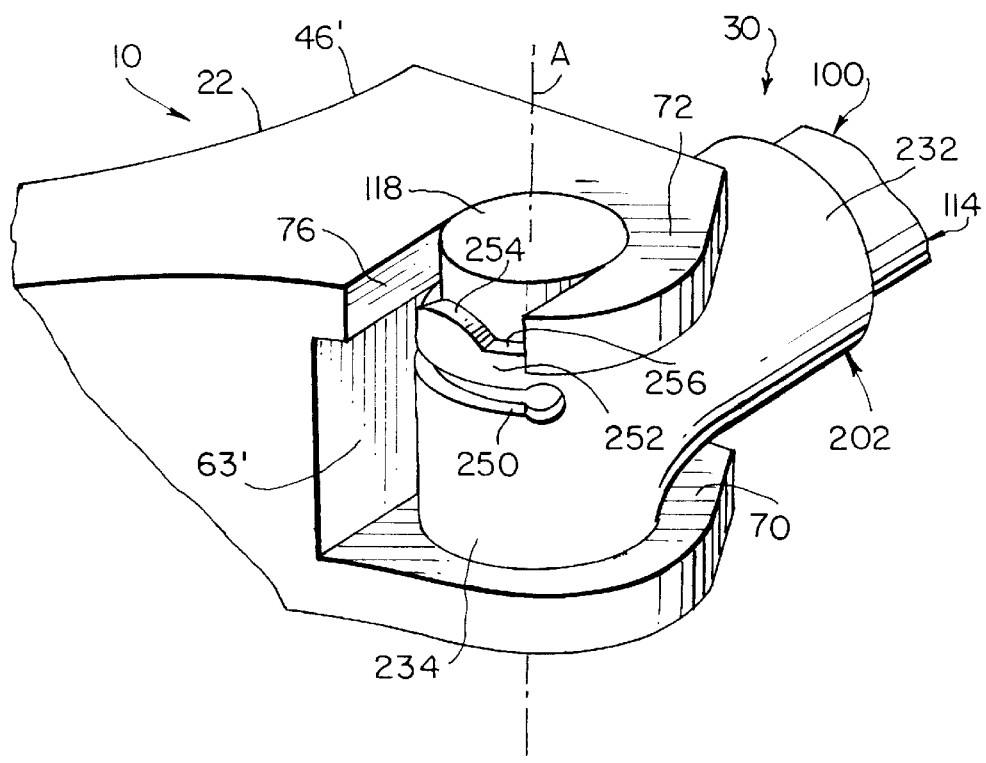
FIG. 13 is an enlarged, partial perspective view of the pipe clamping device illustrated in FIGS. 1–11, except that the retention member of FIG. 12 in accordance with the second embodiment of the present invention is being used.

Referring now to FIGS. 12 and 13, a retention member 202 is illustrated in accordance with a second embodiment of the present invention. Retention member 202 is designed to be used with pipe clamping device 10, discussed above. Retention member 202 includes a collar portion 232, an elongated retaining portion 234, and an inner surface 236. Retention member 202 is substantially equivalent in structure and in function to retention member 102 as described above, except for the presence of a slot 250 which defines a tab portion or spring element 252 with a detent or bump 254 on elongated portion 234. Accordingly, only those additional elements of retention member 232 not included on retention member 102 will be described in detail.

Slot 250 is a narrow opening along approximately three quarters of the length of elongated retaining portion 234. Slot 250 extends substantially parallel to the longitudinal axis of elongated retaining portion 234 in its original, undeformed configuration (not shown) but off the center of elongated retaining portion 234 and in close proximity to the upper side 256 of elongated retaining portion 234. Detent 254 is located on upper side 256 of spring element 252 adjacent slot 250. As seen in FIG. 12, the deformed configuration of retention member 202 has the same basic original configuration as retention member 102 and is deformed as described above with respect to retention member 102.

As shown in FIG. 13, slot 250 and detent 254 are arranged such that when latch assembly 30 is in the engaged position, detent 254 is located within slot 76 on gusset plate 72. Detent 254 provides an aid during installation of clamping device 10 by providing a mechanism to hold bolt 100 in the engaged position, while installing saddle washer 106 and nut 104 onto the free end of bolt 100. This occurs since detent 254 provides an abutment which prevents rotation of bolt 100 about axis A and out of the engaged position. Detent 254 abuts a portion of gusset plate 72 adjacent slot 76 and does not proceed past slot 76 during the application of normal installation forces on bolt 100.

However, slot 250 on retention member 232 enables spring element 252 to be cantilevered to elongated portion 234 and provides a mechanism for moving detent 254 out from within slot 76 so that bolt 100 can be pivoted about axis A out of the engaged position. Spring element 252 provides a base for detent 254 and enables detent 254 to be forced away from slot 76 and gusset plate 72 upon the application of sufficient force on detent 254 to overcome the resistance of spring element 252. When the resistance of spring element 252 has been overcome, detent 254 abuts the side of gusset plate 72 and allows the further pivoting of bolt 100. When the bolt is pivoted about axis A from the disengaged position back to the engaged position, detent 254 will move along gusset plate 72 until it reaches slot 76. Detent 254 will then be raised into slot 76 once again by the force of spring element 252 in the direction of gusset plate 72.

While advantageous embodiments have been chosen to illustrate the invention, it will be understood by those skilled in the art from this disclosure that various changes and modifications can be made therein without departing from the scope of the invention as defined in the appended claims.

What is claimed is:

1. A clamping device for coupling peripheral flanges of a pair of tubular members together, comprising:

retainer means for coupling the peripheral flanges of the tubular members together, and having first and second coupling ends movably coupled together from an open position to a closed position;

a connecting member having a pivoting end and an anchoring end with said pivoting end being pivotally coupled to said first coupling end about a pivot axis between an unengaged position where said anchoring end is spaced from said second coupling end and an engaged position where said anchoring end is removably coupled to said second coupling end; and retention means, coupled to said pivoting end of said connecting member, for maintaining said connecting member coupled to said first coupling end, said retention means being deformable from an original shape to a final shape in response to said connecting member being initially pivoted about said pivot axis from said unengaged position to said engaged position.

2. A clamping device according to claim 1, wherein said retention means comprises a retention member having a collar and an elongated portion.

3. A clamping device according to claim 1, wherein said elongated portion is straight in said original shape and bent in said final shape.

4. A clamping device according to claim 3, wherein said connecting member includes a bolt having a rod and a head, wherein said collar engages said rod.

5. A clamping device according to claim 4, wherein said elongated portion is sized to surround said head of said bolt when in said final shape.

6. A clamping device according to claim 5, wherein said bolt is a T-bolt.

7. A clamping device according to claim 6, wherein said connecting member has a fastening member movably coupled to said anchoring end of said bolt for tightening said connecting member and for moving said first and second coupling ends toward each other.

8. A clamping device according to claim 7, wherein said retention means further comprises means for temporarily securing said bolt in said engaged position.

9. A clamping device according to claim 8, wherein said means for temporarily securing comprises a detent on a spring element.

10. A clamping device comprising:
a retainer having first and second coupling ends movably coupled together from an open position to a closed position, respectively, said first coupling end having a first opening and a second opening;
a connecting member positioned between said first and second openings, said connecting member having a pivoting end and an anchoring end with a longitudinal axis extending therebetween, said pivoting end having a first pivoting element pivotally coupled to said first opening and a second pivoting element pivotally coupled to said second opening to pivot said connecting member about a pivot axis between an unengaged position with said anchoring end being spaced from said second coupling end and an engaged position with said anchoring end being removably coupled to said second coupling end, said second opening of said first coupling end being sized to receive said connecting member between said first and second openings by allowing movement of said connecting member in a direction substantially parallel to said pivot axis to engage and disengage said second pivot element from said first opening; and
a retention member coupled to said pivoting end of said connecting member for prohibiting movement of said connecting member in a direction parallel to said pivot axis.

11. A clamping device according to claim 10, wherein said second opening is a slot which opens away from said second retainer end.

12. A clamping device according to claim 11, wherein said first opening is a substantially closed circular aperture.

13. A clamping device according to claim 12, wherein each of said first and second pivoting elements are cylindrical and sized to be received within said circular aperture and said slot, respectively.

14. A clamping device according to claim 13, wherein said connecting member comprises a bolt.

15. A clamping device according to claim 14, wherein said bolt is a T-bolt having a head forming said first and second pivoting elements.

16. A clamping device according to claim 15, wherein said retention member is coupled to said pivoting end of said bolt between said first and second openings of said retainer.

17. A clamping device according to claim 16, wherein said retention member has a collar and an elongated portion.

18. A clamping device according to claim 17, wherein said T-bolt further has a rod adjacent said head, wherein said collar engages said rod.

19. A clamping device according to claim 18, wherein said elongated portion surrounds said head of said T-bolt.

20. A clamping device according to claim 19, further comprising:
a fastening member coupled to said anchoring end of said bolt for tightening said bolt and for moving said first and second coupling ends toward each other.

21. A clamping device according to claim 16, wherein said retention member has a locking member that removably secures said fastener in said engaged position.

22. A clamping device according to claim 21, wherein said locking member comprises a detent on a spring element.

23. A method of forming a clamping device comprising the steps of:
providing a retainer having first and second coupling ends pivotally coupled together from an open position to a closed position, said first coupling end having first and second mounting members with first and second openings, respectively, said first coupling end further having a pivot axis extending through said mounting members,
inserting a fastener between said mounting members of said retainer, said fastener having a pivoting end and an anchoring end with a longitudinal axis extending therebetween, said pivoting end having first and second pivoting elements, said fastener being inserted into said retainer by moving said first pivoting element substantially along said pivot axis to engage said securing portion, and to pivotally couple said fastener to said first retainer end such that said fastener can pivot about said pivot axis between an unengaged position where said anchoring end is spaced from said second retainer end to an engaged position where said anchoring end is removably coupled to said second retainer end; and
coupling a retention member to said pivoting end of said fastening member to prohibit said pivoting end from being accidentally removed from said first retainer end, said retention member coupled to said pivoting end between said first and second mounting members to prohibit movement of said fastener in a direction along said pivot axis.

24. A method according to claim 23, further comprising the step of
pivoting said fastener and said retention member coupled thereto about said pivot axis from said open position toward said closed position to deform a portion of said retention member.

25. A method according to claim 24, further comprising the step of
further pivoting said fastener and said retention member coupled thereto about said pivot axis to said closed position automatically further deforming a portion of said retention member.

26. A method according to claim 25, further comprising the step of
tightening a fastening member to said fastener to pivot said first and second retainer ends toward each other.

27. A clamping device for coupling a pair of tubular members together, comprising:
a retainer having first and second coupling ends movably coupled together between an open position and a closed position, said first coupling end having first and second mounting members with first and second mounting openings, respectively; and a latch assembly releasably coupling said first and second ends together between a latched position and an unlatched position, said latch assembly including a connecting member having a pivoting end with first and second pivot elements pivotally coupled to said first coupling end of said retainer and an anchoring end operatively engageable with said second coupling end of said retainer, retention member coupled to said pivoting end of said connecting member and located between said first and second mounting members, said retention member extending from said pivoting end of said connecting member towards said anchoring end of said connecting member and overlapping a portion of said anchoring end, and a tightening member movably coupled to said anchoring end of said connecting member.

\* \* \* \* \*